United States Patent
Hamm et al.

(10) Patent No.: US 11,934,177 B2
(45) Date of Patent: Mar. 19, 2024

(54) COLLISION TESTING ON THE BASIS OF HIGH-QUALITY GEOMETRY

(71) Applicant: Siemens Aktiengesellschaft, Munich (DE)

(72) Inventors: Carsten Hamm, Eggolsheim (DE); Jörg Handeck, Erlangen (DE); Tomas Sauer, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 426 days.

(21) Appl. No.: 17/422,673

(22) PCT Filed: Jan. 2, 2020

(86) PCT No.: PCT/EP2020/050017
§ 371 (c)(1),
(2) Date: Jul. 13, 2021

(87) PCT Pub. No.: WO2020/148097
PCT Pub. Date: Jul. 23, 2020

(65) Prior Publication Data
US 2022/0187796 A1 Jun. 16, 2022

(30) Foreign Application Priority Data
Jan. 14, 2019 (EP) .................................... 19151628

(51) Int. Cl.
G05B 19/4155 (2006.01)
B25J 9/16 (2006.01)

(52) U.S. Cl.
CPC ........ *G05B 19/4155* (2013.01); *B25J 9/1666* (2013.01); *G05B 2219/39082* (2013.01)

(58) Field of Classification Search
CPC ...... G05B 19/4155; G05B 2219/39082; G05B 2219/35112; G05B 2219/39095; G05B 2219/49145; G05B 19/4061; B25J 9/1666
See application file for complete search history.

(56) References Cited

U.S. PATENT DOCUMENTS 10,145,747 B1 * 12/2018 Lin ........................ A61B 90/06
10,369,693 B1 * 8/2019 Levine ................... A01C 7/085
(Continued)

FOREIGN PATENT DOCUMENTS

WO   WO 2017146890 A1   8/2017

OTHER PUBLICATIONS

PCT International Search Report and Written Opinion of International Searching Authority dated Sep. 6, 2020 corresponding to PCT International Application No. PCT/EP2020/050017 filed Feb. 1, 2020.

*Primary Examiner* — Jeff A Burke
*Assistant Examiner* — Sihar A Karwan
(74) *Attorney, Agent, or Firm* — Henry M. Feiereisen LLC

(57) ABSTRACT

Elements of a machine are moved relative to one another along several axes. A monitoring device receives groups of position values of the axes which specify the relative position of the elements to one another. The surfaces and/or volumes of the elements taking up working space are determined therefrom. The monitoring device checks whether a collision risk between the elements exists. The monitoring device models at least parts of the surfaces of the elements with two-dimensional splines defined by nodes and checkpoints. The monitoring device further determines from the checkpoints of the splines for sections envelopes which envelop respective element in the respective section, and uses the respective envelope as a surface that is taken up by the respective element in the respective section. Boundary (Continued)

lines of faces of the envelopes are straight connecting lines of the checkpoints.

9 Claims, 7 Drawing Sheets

(56) References Cited

U.S. PATENT DOCUMENTS

| | | |
|---|---|---|
| 2001/0048857 A1 | 12/2001 | Koch |
| 2003/0109780 A1 | 6/2003 | Coste-Maniere et al. |
| 2016/0242858 A1 | 8/2016 | Moctezuma de la Barrera et al. |

* cited by examiner

US 11,934,177 B2

COLLISION TESTING ON THE BASIS OF HIGH-QUALITY GEOMETRY

CROSS-REFERENCES TO RELATED APPLICATIONS

This application is the U.S. National Stage of International Application No. PCT/EP20207/050017, flied Jan. 2, 2020, which designated the United States and has been published as international Publication No. WO 2020/148097 A1 and which claims the priority of European Patent Application, Serial No, 19151628.5, filed Jan. 14, 2019, pursuant to 35 U.S.C. 119(a)-(d).

BACKGROUND OF THE INVENTION

The present invention relates to a monitoring method for the operation of a machine having a plurality of axes by means of which elements of the machine are moved relative to one another in a position-controlled fashion,
  wherein a monitoring facility receives a number of groups of position values of the axes, wherein the groups of position values each specify the position of the elements of the machine relative to one another,
  wherein on the basis of modelling of the elements of the machine, modelling of the kinematics of the elements of the machine for the groups of position values of the number of groups of position values in each case, the monitoring facility determines which element of the machine respectively takes up which surface and/or which volume in a working space of the machine,
  wherein the monitoring facility checks, on the basis of the determined surfaces and/or volumes, whether there is a risk of elements of the machine colliding with one another, and
  wherein the monitoring facility reacts in accordance with the result of the check.

The present invention further relates to a computer program for a monitoring facility, wherein the computer program comprises machine code which can be processed by the monitoring facility, wherein the processing of the machine code by the monitoring facility causes the monitoring facility to carry out such a monitoring method.

The present invention further relates to a monitoring facility, wherein the monitoring facility is programmed with such a computer program, such that the monitoring facility carries out such a monitoring method during operation.

The present invention further relates to a combination of such a monitoring facility with a control facility for controlling the operation of a machine having a plurality of axes by means of which elements of the machine are moved relative to one another in a position-controlled fashion.

The present invention further relates to a machine, wherein the machine has a plurality of axes by means of which elements of the machine are moved relative to one another in a position-controlled fashion, wherein the machine is controlled by a control facility, wherein such a monitoring facility is assigned to the control facility.

In the course of increasing automation of machining and processing operations in industrial production, it is becoming ever more important to avoid damage to humans and machines which can occur as a result of a collision. This requires rapid, robust, and reliable detection of the risk of a collision, that is to say in advance, before the collision has actually occurred.

In order to be able to detect a collision in an automated manner in advance, geometric modelling of the machine and the relevant elements of the machine is required. The modelling can comprise both stationary elements of the machine (for example, the base body or a housing of the machine) and movable elements of the machine (for example, an axis or a robotic arm). In some cases, the modelling also comprises elements whose contour changes during the operation of the machine (typically the workpiece).

Good collision detection is based on an algorithm by means of which a high-quality decision about a possible imminent collision can be made. It is particularly important to avert a specific imminent collision in advance, for example, by stopping the machine. In some cases, the collision calculation can also be used to determine the distance between elements of the machine and to take into account the determined distances within the framework of the control. The operation of the machine can thus be optimized, for example, by setting speed omit values accordingly.

In the prior art, algorithms are known in which the elements of the machine are modelled on the basis of triangular networks. The individual elements are thus composed of triangular surfaces. An example of this procedure is STL (=Standard Tessellation Language). In many cases, the edges in each case are common to two triangles and the corners in each case are common to a plurality of triangles. In the prior art, algorithms are furthermore known in which the solid bodies are approximated by elementary geometric figures such as, for example, sphere, cuboid, cone, or cylinder. In both cases, a disproportionate additional effort is required to increase the accuracy of the modelling. This applies both to modelling as such and to collision monitoring. In practice, therefore, a compromise must always be reached between the accuracy of the modelling and the speed with which monitoring for an imminent collision is to take place.

A method is known from US 2016/0 242 858 A1 in which a treatment area of a patient is monitored by means of a camera. The treatment can be carried out by means of a machine-operated treatment tool of a treatment facility. Position sensors, which are detected by means of the camera, are arranged both on the limbs of the patient and on the treatment tool. Elements of the treatment facility, limbs of the patient and a detection area of the camera can be modelled by means of splines. It is monitored when elements of the treatment facility or limbs of the patient conceal visible areas which are to be captured by means of the camera. In this case, a message is output so that an operator of the treatment facility can reposition the camera.

The object of the present invention is to create possibilities by means of which high-precision modelling of the elements of the machine is possible with a comparatively low computational effort.

SUMMARY OF THE INVENTION

The object is achieved by a monitoring method as set forth hereinafter. Advantageous embodiments of the monitoring method are the subject matter of the dependent claims.

According to the invention, a monitoring method of the type mentioned at the beginning is configured in that
  the monitoring facility models at least part of the surface of at least one of the elements of the machine by means of a number of two-dimensional splines which are defined by respective nodes and respective checkpoints, if necessary, plus weights, the monitoring facility determines, on the basis of the checkpoints of the respective spline for the respective section, a respective envelope which encloses the at least one element in the respective section, straight connecting lines of the checkpoints of the respective spline are boundary lines of surfaces of the respective envelopes and the monitoring facility uses the respective envelope as a surface which is taken up by at least one element of the machine in the respective section.

A two-dimensional spline for the purposes of the present invention is a spline which extends in three-dimensional space, the manner in which the spline extends in the three-dimensional space, in other words the position, the orientation and curve shape of the spline, being defined by variable in two dimensions.

The respective spline preferably describes at least one third-degree function in both dimensions of the spline in each case. An illustration of the corresponding part of the corresponding element via splines is usually possible without loss, in other words without approximation of the actual contour, because the actual surfaces were originally spline surfaces or all surface illustrations generated by means of a CAD system can be transformed into a spline surface with any accuracy.

As is well known to those skilled in the art, a spline can be clearly and fully described by checkpoints and nodes and, if necessary, weights. Such a description is also compact. Checkpoints and nodes and, if necessary, weights of the respective spline are therefore defined for parameterizing the respective section. Such an illustration usually only requires a relatively small storage space and, moreover, is independent of the desired local resolution. If the weights have a uniform value (in particular the value 1), this is a rational spline. If the weights have different values from one another, this is a fractured rational spline.

The number of groups of position values is at least 1. In this case, a respective, current state of the machine is defined by means of the (single) group of position values. Alternatively, the number of groups of position values may be greater than 1. In this case, a temporal sequence of respective current states of the machine is defined by means of the groups of position values, that is to say a movement.

Due to the modelling by splines, the corresponding part of the surface of the element is thus modelled by a number of sections which can be parameterized by respective parameters. The sections are uniform before their parameterization. The specific selection of the respective parameters determines the position, the orientation, and the curve shape of the respective section of the surface.

In the context of the present invention, therefore, the elements of the machine relevant for the collision calculation are represented by means of surface models, as are often also used in CAD models. The corresponding descriptions as such are often already available, in particular for the elements of the machine. In this case, the descriptions can be used directly. Thus, in contrast to a network of triangles, and also in contrast to an approximation by elementary geometric figures, the sections of the surfaces of the elements of the machine represent an exact illustration of the elements of the machine.

It is possible to model individual elements completely using the corresponding splines. It is also possible to model several elements—even all elements—partially or completely by means of the corresponding splines. In some cases, however, modelling with elementary geometric figures or with networks of triangles can be useful. However, at least one of the elements of the machine is at least partially modelled in the manner according to the invention.

The surfaces of the elements of the machine for the respective element of the machine are preferably related to a coordinate system of the respective element of the machine and, on the basis of the position values, the location of the origin of the coordinate system of the respective element of the machine and the orientation of the coordinate system of the respective element of the machine are transformed in the working space of the machine. A simple transformation of the entire respective element is thereby possible.

The position values of the axes can, as required, be setpoints or actual values, that is to say either the position setpoints or the actual position values.

The response of the monitoring facility, which is dependent on the result of the test, can in particular comprise in the event that the check has not revealed an imminent collision of elements of the machine, the monitoring facility releasing the number of groups of position values or groups of position values subsequent to the number of groups of position values for execution, and in the event that the check has revealed an imminent collision of elements of the machine, the monitoring facility not releasing the execution of the sequence of groups of position values for execution and/or a command to stop the machine being transmitted to a control facility of the machine.

If the position values of the axes are actual values, in the event that there is no threat of collision, groups of position setpoints must be released for execution which have not yet been executed at the time of the check and consequently follow the checked position values in time. Conversely, in this case, in the event of an imminent collision, a command to stop the machine must be transmitted to a control facility of the machine. If the position values of the axes are setpoints, the same procedure can be adopted. In this case, however, it is preferable to check groups of position values that have not yet been executed and, in the event that there is no threat of collision, to release the number of groups of position values themselves for execution and, otherwise (if, in other words, a collision is imminent), not to release the execution of the number of groups of position values for execution.

It is possible for the monitoring facility to be a facility different from the control facility. In this case, a "genuine" transmission of corresponding messages and signals must take place. Alternatively, the monitoring facility can be integrated into the control facility or form a unit with the control facility. In this case, the transmission may be degenerate.

If the position values of the axes are actual values, the aforementioned procedure must be carried out in parallel to the control of the machine in real time. If the position values of the axes are setpoints, an execution parallel to the control of the machine in real time or separately from the control of the machine is alternatively possible.

Within the scope of the present invention, the splines themselves are not used for collision monitoring itself, but rather only their modelling, that is to say the checkpoints and—if necessary—the nodes. In particular, a respective envelope, which encloses the at least one element in the respective section, is determined on the basis of the checkpoints of the respective spline for the respective section. This envelope encloses the modelled element of the machine in the corresponding section. Straight connecting lines of the checkpoints of the respective spline are the boundary lines of surfaces of the respective envelope. The respective envelope is used as the surface occupied by the modelled element of the machine in the respective section. This illustration is relatively simple and, above all, easy to handle in terms of processing. The procedure is based on that fact—well known to those skilled in the art—that the actual surface of the modelled element of the machine, relative to the respective section, lies within the envelope thus determined. However, the collision calculation can take place much more easily and quickly with the envelope than with the spline itself.

In a particularly preferred embodiment of the present invention, it is provided that initially only basic nodes and the associated checkpoints and, if necessary, weights are defined as nodes and checkpoints and, if necessary, weights for the respective spline, and the monitoring facility iteratively executes the following steps until either the collision check reveals that there is no risk of a collision, or a stop criterion is met:
  a) The monitoring facility checks whether the risk of a collision is imminent based on a respective envelope determined by the currently defined checkpoints;
  b) the monitoring facility accepts the test result as final in the event that there is no threat of elements of the machine colliding with one another;
  c) in the event that there is a threat of elements of the machine colliding, the monitoring facility checks whether the stop criterion is met;
  d) in the event that there is a threat of elements of the machine colliding with one another and the stop criterion is met, the monitoring facility accepts the test result as final;
  e) in the event that there is a threat of elements of the machine colliding with one another and the stop criterion is not met, the monitoring facility defines additional nodes for the respective spline in addition to the currently defined nodes and redetermines the checkpoints and, if necessary, weights so that the now defined nodes and certain checkpoints and, if necessary, weights describe the same spline as before and a now determined respective envelope is at a smaller maximum distance from the respective spline than the respective envelope determined before the definition of the additional nodes and the redetermination of the checkpoints.

This procedure makes it possible firstly to start with relatively simple modelling of the corresponding part of the corresponding element of the machine and to check this simple modelling for the risk of a collision. If there is already no threat of a collision by means of the simple modelling, then there is in fact no threat of a collision. If, on the other hand, the risk of a collision is detected, this may alternatively be due to the fact that there is in fact—that is to say, also in the real world—the risk of a collision or that the modelling is not sufficiently accurate. The test can therefore be performed again with more accurate modelling. This procedure can be continued either until the risk of a collision is no longer detected or the stop criterion is reached, and a collision nevertheless detected.

As a rule, there is a risk of a collision only in the case of a few elements and here too only at a few points of the modelled elements. It is therefore possible to restrict the repetition to precisely these few sections. For the vast majority of sections, execution already leads to the conclusion that there is no threat of a collision. Iteration is not necessary for these sections.

The stop criterion is usually determined by a sufficient approximation of the envelope to the spline. In particular, on the basis of the respective currently defined checkpoints, an upper limit for the distance of the envelope from the spline can be determined in a simple manner. If this distance falls below a specified threshold, this can be used as a stop criterion. In this case, it can be assumed that, even in the case of even more accurate modelling, a collision is still detected.

The respective additional nodes are preferably defined in such a way that at least some of the respective newly determined checkpoints lie between the beginning and the end of the spline and on the spline. As a result, it is ensured in a simple manner that the respective subsequent envelope is at a shorter maximum distance from the actual spline than the respective preceding envelope.

In the case of a modelling with splines, it can furthermore be taken into account within the scope of the evaluation that the checkpoints of a spline only have a local effect. In the one-dimensional case—i.e. in the case of a spline which extends in two-dimensional space and in which the manner in which the spline extends in two-dimensional space is defined by variable in one dimension—a specific checkpoint can influence the course of the spline only within the scope of nodes preceding n and following n. The checkpoint, on the other hand, has no influence on the course of the spline beyond the nodes preceding n and following n. The numerical value n depends on the complexity of the spline. It can be, for example, 3, 4 or 5. The facts explained above for a one-dimensional spline also apply analogously to a two-dimensional spline, that is to say, a spline surface.

The effectiveness of the checkpoints, which is only local, can be utilized in that
  groups of adjacent checkpoints are respectively accessed for the sections,
  the envelope is determined for the accessed groups, and
  collision testing is carried out by collision testing the envelope.

In this case, the size of the groups of adjacent checkpoints is determined by the complexity of the spline. Furthermore, in this case, all relevant groups of adjacent checkpoints must be accessed. As a result, many individual small envelopes can be determined for the corresponding element of the machine which overlap one another and, in their entirety, enclose the entire correspondingly modelled element. The procedure must therefore be adopted sufficiently often. However, this can still be simpler and, above all, also more accurate than working with the envelopes of a considerably larger multiplicity of checkpoints.

The object is furthermore achieved by a computer program as set forth hereinafter. According to the invention, a computer program of the type mentioned at the beginning is designed in such a way that the processing of the machine code by the monitoring facility causes the monitoring facility to perform a monitoring method according to the invention.

The object is furthermore achieved by a monitoring facility as set forth hereinafter. According to the invention, a monitoring facility of the aforementioned type is programmed with a computer program according to the invention, so that the processing of the machine code by the monitoring facility causes the monitoring facility to carry out a monitoring method according to the invention.

The object is furthermore achieved by a combination of a monitoring facility with a control facility in accordance with the invention.

The object is furthermore achieved by a machine as set forth hereinafter. According to the invention, the control facility is assigned to a monitoring facility according to the invention.

BRIEF DESCRIPTION OF THE DRAWING

The properties, features and advantages of this invention described above and the manner in which these are achieved, will become clearer and more readily understandable in connection with the following description of the exemplary embodiments which are explained in more detail in conjunction with the drawings, in which, shown in a schematic representation.

DETAILED DESCRIPTION OF PREFERRED EMBODIMENTS

Figure 1:
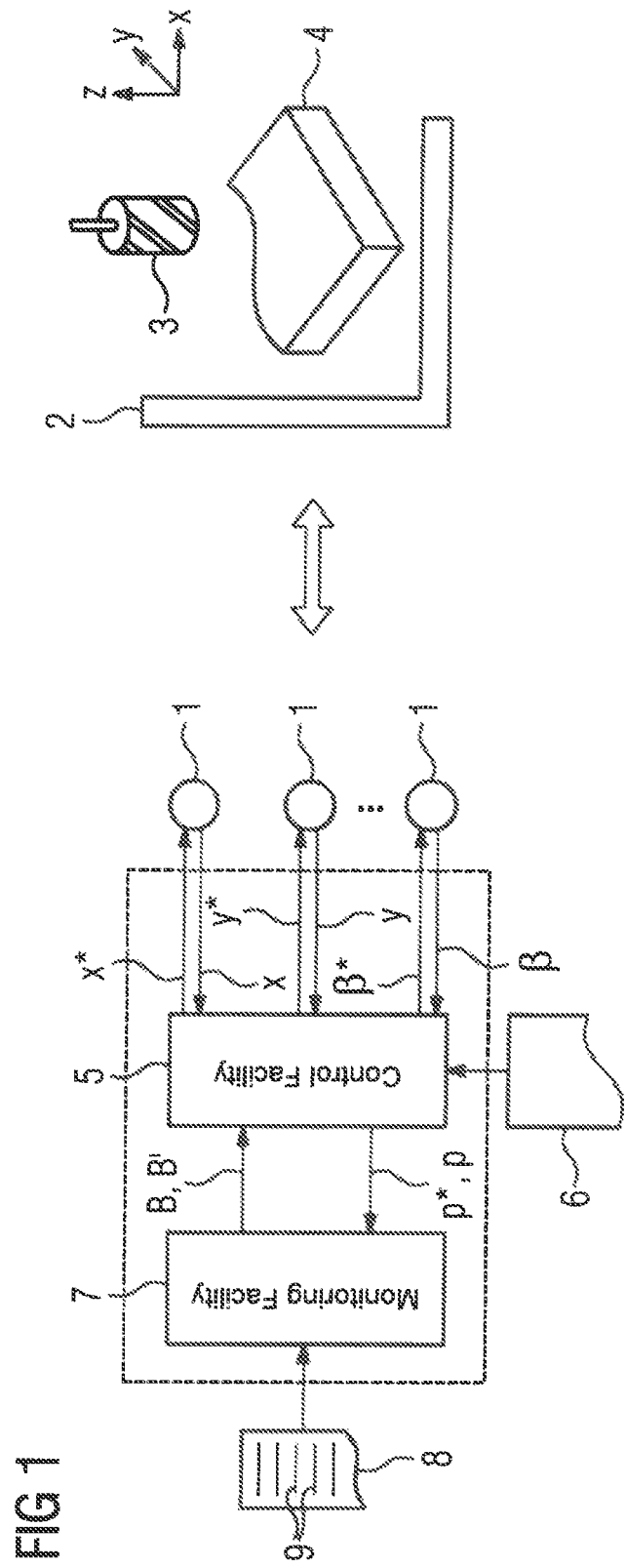
FIG. 1 shows a machine with associated control facility and a monitoring facility.
Figure 2:
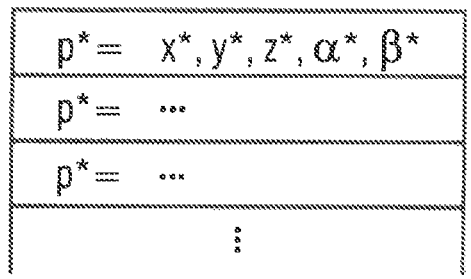
FIG. 2 shows a group of setpoints.

According to FIG. 1, a machine has several axes 1. By means of the axes 1, elements 2 to 4 of the machine are moved relative to one another in a position-controlled fashion. The movement of the elements 2 to 4 relative to one another can be translational and/or rotational. Accordingly, the axes 1 are each controlled with setpoints, the setpoints simultaneously output to the axes 1 defining the respective translational positioning and/or the respective orientation of the elements 2 to 4 of the machine relative to one another. The axes 1 therefore include position controllers, for which a respective position setpoint and a respective actual position value are specified. The respective position controller determines a respective manipulated variable, so that the respective actual position value is approximated as far as possible to the respective position setpoint. The respective manipulated variable is output to a respective drive of the respective axis 1 so that the axis 1 is moved accordingly. The totality of the displacement movements carried out by the axes corresponds to the total displacement movement of the machine.

For example, the respective group of setpoints corresponding to the illustration in HG 2 for corresponding axes 1 of the machine can each comprise a setpoint x*, y*, z* for the x-direction, the y-direction, and the z-direction of a Cartesian coordinate system and/or in each case one setpoint α*, β* for one or two orientations within this coordinate system. The exact nature of the setpoints as such is of secondary importance. What is decisive is that they define the respective translational positioning and/or the respective orientation of the elements 2 to 4 of the machine relative to one another.

In principle, the machine can be of any nature. For example, the machine can be a machine tool, a production machine, or an industrial robot. Often one of the elements 2 to 4 of the machine is a stationary element of the machine. For example, the element 2 can be the base body of the machine. Furthermore, one of the elements 2 to 4 of the machine is a movable element of the machine. For example, the element 3 can be a robotic arm or—as here—a tool of the machine. In some cases, furthermore, at least one of the elements 2 to 4 of the machine is also an element, the contour of which changes during operation of the machine. This is often the case in particular in workpieces of a machine tool.

The elements 2 to 4 of the machine are purely by way of example. As a rule, the machine has further elements which are not shown in the FIG and which will not be discussed in greater detail below. However, the following embodiments may also be valid for these elements.

Setpoints that are output simultaneously to the axes 1 are referred to hereinafter as a group of setpoints. The corresponding group is assigned the reference character p*. The reference character p* thus represents a vector which contains its respective position setpoint for each axis.

A number of groups p* of setpoints are fed to the axes 1. If the number is equal to 1, the (single) group p* of setpoints defines the current position of the elements 2 to 4 relative to one another. If the number is greater than 1, the number defines a chronological sequence which defines the temporal course of the movement of the elements 2 to 4 relative to one another and thus the paths on which the elements 2 to 4 move relative to one another.

The machine is controlled by a control facility 5. The control facility 5 is generally designed as a numerical control (CNC) or similar control for this purpose. As a rule, the control facility 5 also comprises the position controllers of the axes 1. The control facility 5 is usually given a utility program 6 (for example, a parts program). In this case, the utility program 6 defines the mode of operation of the machine to be carried out and thereby defines in particular the sequence of the groups V of setpoints. However, the groups p* of setpoints can also be generated in other ways. For example, the machine can operate in a manual mode in which an operator of the control facility 5 directly specifies travel commands which are converted by the control facility 5 into corresponding setpoints for the position-controlled axes 1. It is also possible that the setpoints generated on the basis of the utility program 6 are still subjected to corrections by the control facility 5.

Furthermore, a monitoring facility 7 is present. In the present case, the monitoring facility 7 is assigned to the control facility 5. This is indicated in FIG. 1 by a dashed outline which encloses the control facility 5 and the monitoring facility 7. As a result of the assignment, the monitoring facility 7 and the control facility 5 thus form a corresponding combination. The present invention is explained hereinafter in connection with the corresponding combination or assignment. In some embodiments of the present invention, however, the monitoring facility 7 can also be operated separately from the control facility 5.

The monitoring facility 7 is programmed with a computer program 8. The computer program 8 comprises machine code 9 which can be processed by the monitoring facility 7. The processing of the machine code 9 by the monitoring facility 7 causes the monitoring facility 7 to carry out a monitoring method which is explained in more detail hereinafter.

Figure 3:
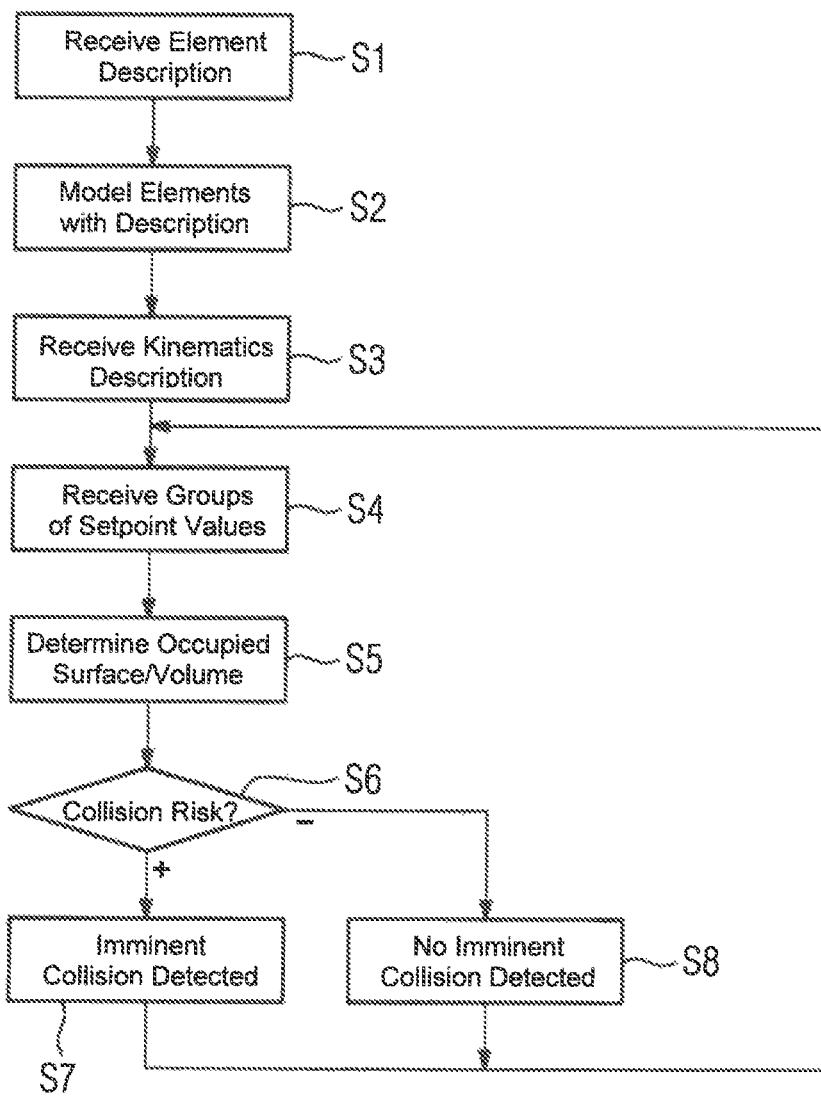
FIG. 3 shows a flow chart.

According to FIG. 3, the monitoring facility 7 first receives descriptions D of the individual elements 2 to 4 of the machine in a step S1. In a step S2, the monitoring facility 7 models the elements 2 to 4 of the machine on the basis of the descriptions D received.

In a step S3, the monitoring facility 7 receives a description D' of the kinematics of the machine. In a step S4, the monitoring facility 7 receives a number of groups p* of setpoints of the axes 1. The respective group p* of setpoints defines the corresponding control of the axes 1 and thus the positions and/or orientations of the elements 2 to 4 of the machine relative to one another.

In a step S5, the monitoring facility 7 determines, for the groups p* of setpoints, which element 2 to 4 of the machine in each case occupies which surface and/or which volume in a working space of the machine. The monitoring facility 7 utilizes the modelling of the elements 2 to 4 of the machine determined in step S2, the modelling of the kinematics of the elements of the machine given on the basis of step S3 and the respective group p* of setpoints.

In a step S6, the monitoring facility 7 checks whether there is a risk of elements 2 to 4 of the machine colliding with one another. The monitoring facility 7 thus checks in step S6 whether there is a risk of one of the elements 2 to 4 colliding with another of the elements 2 to 4. Step S6 is checked using the surfaces and/or volumes determined in step S5. Depending on whether or not the risk of a collision is detected in step S6, the monitoring facility 7 moves to a step S7 or to a step S8.

As a rule, in the context of step S6, a collision is always detected if two of the elements 2 to 4 of the machine come too close or even intersect in the working space of the machine. However, one exception may be for a tool (for example, the element 3) of the machine and a workpiece (for example, the element 4 of the machine). In this case, overlaps can be accepted to a certain extent. The type of overlaps which these may be is known to the monitoring facility 7.

Allowing the tool and workpiece to overlap in the context of collision detection is known as such to those skilled in the art. It does not therefore need to be explained in detail. It should merely be pointed out that collision detection as such, that is to say step S6, does not differ from the procedure of the prior art. What is decisive is the difference in the manner in which the surfaces and volumes of individual elements 2 to 4 of the machine are determined. This is the subject matter of the present invention, but not the distinction between "desired collision"=processing and "undesired collision".

The monitoring facility 7 executes step S7 if it has detected an imminent collision of elements 2 to 4 of the machine with one another. It is possible that the monitoring facility 7 in step S7 does not enable the execution of the number of groups p* of setpoints for execution. This procedure is possible, in particular, when the setpoints are related to future periods of time. Alternatively, it is possible for the monitoring facility 7 to transmit a command for stopping the machine to the control facility 5. This procedure is particularly useful if the setpoints are setpoints that have already been executed. In both cases, the monitoring facility 7 can transmit a corresponding command B to the control facility 5.

The monitoring facility 7 executes step S8 if it has not detected an imminent collision of the elements 2 to 4 of the machine with one another. In step S8, the monitoring facility 7 can release the number of groups p* of setpoints for execution—for example, by transmitting a corresponding command B' to the control facility 5. This procedure is possible, in particular, when the setpoints relate to future periods of time. If necessary, it can also release groups p* of setpoints for execution subsequent to the number of groups p* of setpoints. This procedure is particularly useful if the setpoints are setpoints that have already been executed.

Within the framework of the procedure of FIG. 3, the position values of the axes 1 are setpoints. Setpoints may be known in advance. It is therefore possible, but not absolutely necessary, for the monitoring facility 7 to carry out the procedure of FIG. 3 in parallel to the control of the machine by the control facility 5 and in real time.

Figure 4:
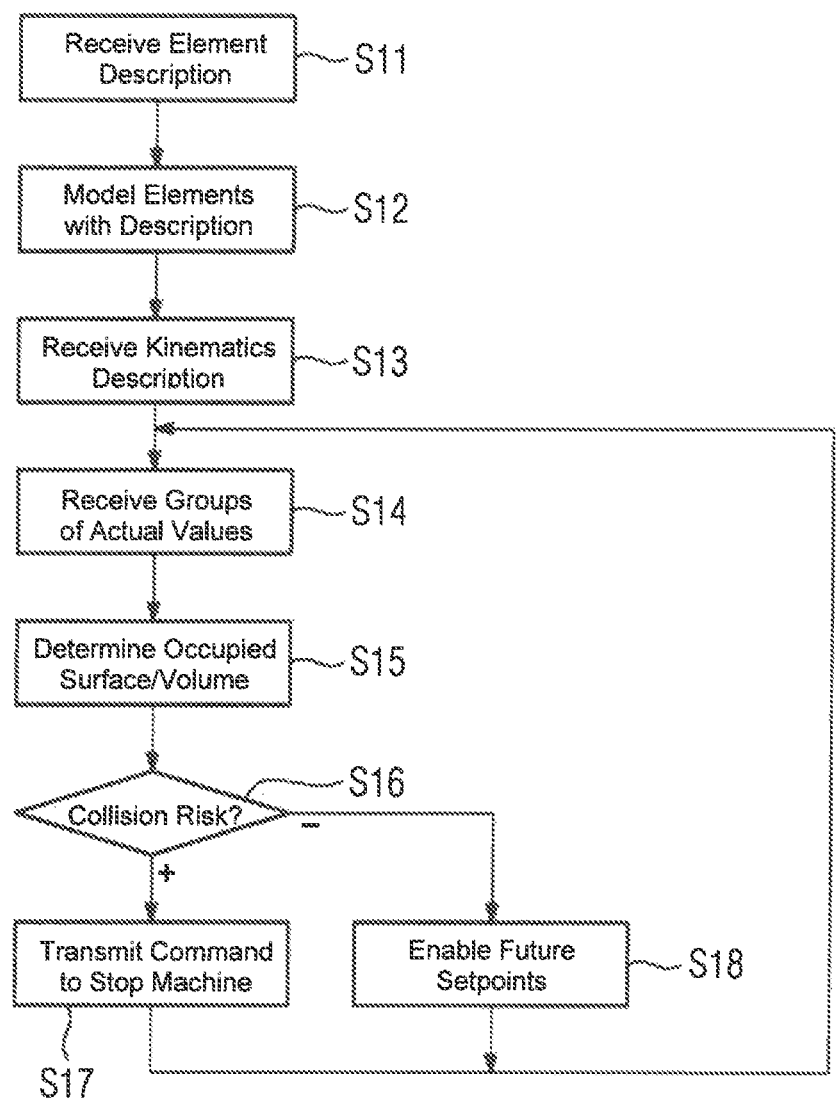
FIG. 4 shows a flow chart.

FIG. 4 shows a procedure similar to FIG. 3 in its steps S11 to S18. The difference is that in step S14, the monitoring facility 7 does not receive a number of groups p* of setpoints of the axes 1, but a number of groups p of actual values of the axes 1. This results in various differences.

First, the monitoring facility 7 must execute the procedure of FIG. 4 in parallel to the control of the machine by the control facility 5 and in real time.

Furthermore, it is possible that the test of step S18 has to be modified compared to the test of step S6. This is because, while in step S6 of FIG. 3 an essentially arbitrarily small distance of the elements 2 to 4 of the machine from one another can be permitted, a collision must already be detected during step S18 if the distance reaches or falls below a minimum permissible value. This is because, within the framework of the procedure of FIG. 4, the machine must still be stopped in good time. An exception may also apply here to a tool of the machine and a workpiece.

Furthermore, in step S17® if the monitoring facility 7 has detected an imminent collision of elements 2 to 4 of the machine with one another—the monitoring facility 7 must transmit a command B for stopping the machine to the control facility 5, so that the control facility 5 can stop the machine.

Finally, the command B transmitted in step S18, signals that the monitoring facility 7 enables the execution of position setpoints which are related to future periods of time.

The approach of the sequence of steps in FIGS. 3 and 4 is the same as in the prior art. Hereinafter, therefore, only the embodiments of the individual steps according to the invention will be discussed, insofar as this is necessary. Hereinafter, only the modifications of steps S1 to S8 of FIG. 3 will be discussed. Analogous embodiments apply to steps S11 to S18 in FIG. 4.

First, the step S1 and the manner in which the descriptions ID of the individual elements 2 to 4 are defined for the monitoring facility 7 is designed in a manner according to the invention. This is explained in more detail hereinafter for the element 2. Analogous embodiments can apply to the other elements 3, 4 of the machine.

Figure 5:
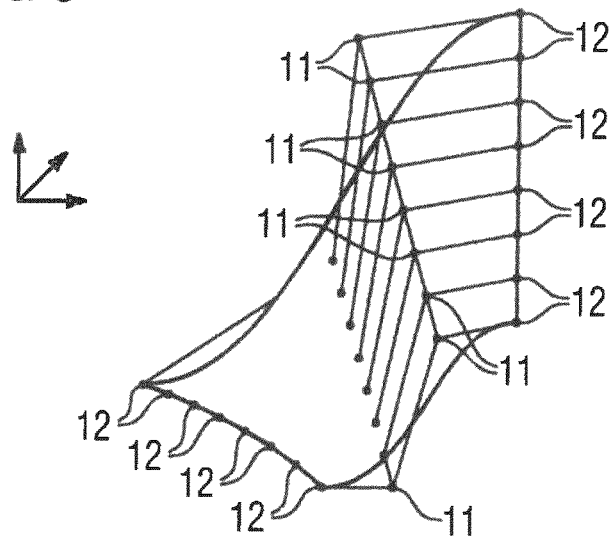
FIG. 5 shows a perspective representation of a two-dimensional spline.

In particular, the surface of the element 2 or at least a part of this surface is modelled by a number of sections of a surface. The individual sections are parameterized by respective parameters. For example, the locations indicated by black dots in FIG. 5 are specified in the area. Before the parameterization—as long as no concrete values have yet been assigned to the parameters with which the sections are parameterized—the sections are uniform. This applies both to the sections of the surface by which the element 2 is described and—if several elements 2 to 4 are modelled according to the invention—on a cross-element basis for the surfaces with which the other elements 3, 4 are described. The sections can be parameterized by the parameters in such a way that the parameters—that is to say the specific values for the respective section of the surface—define the position, the orientation, and the curve shape of the respective section of the surface of the element 2. The sections of the surface can in particular be two-dimensional splines. In this case, the parameters in the two dimensions of the surface are used, for example, to describe a polynomial of at least the third degree.

Figure 6:
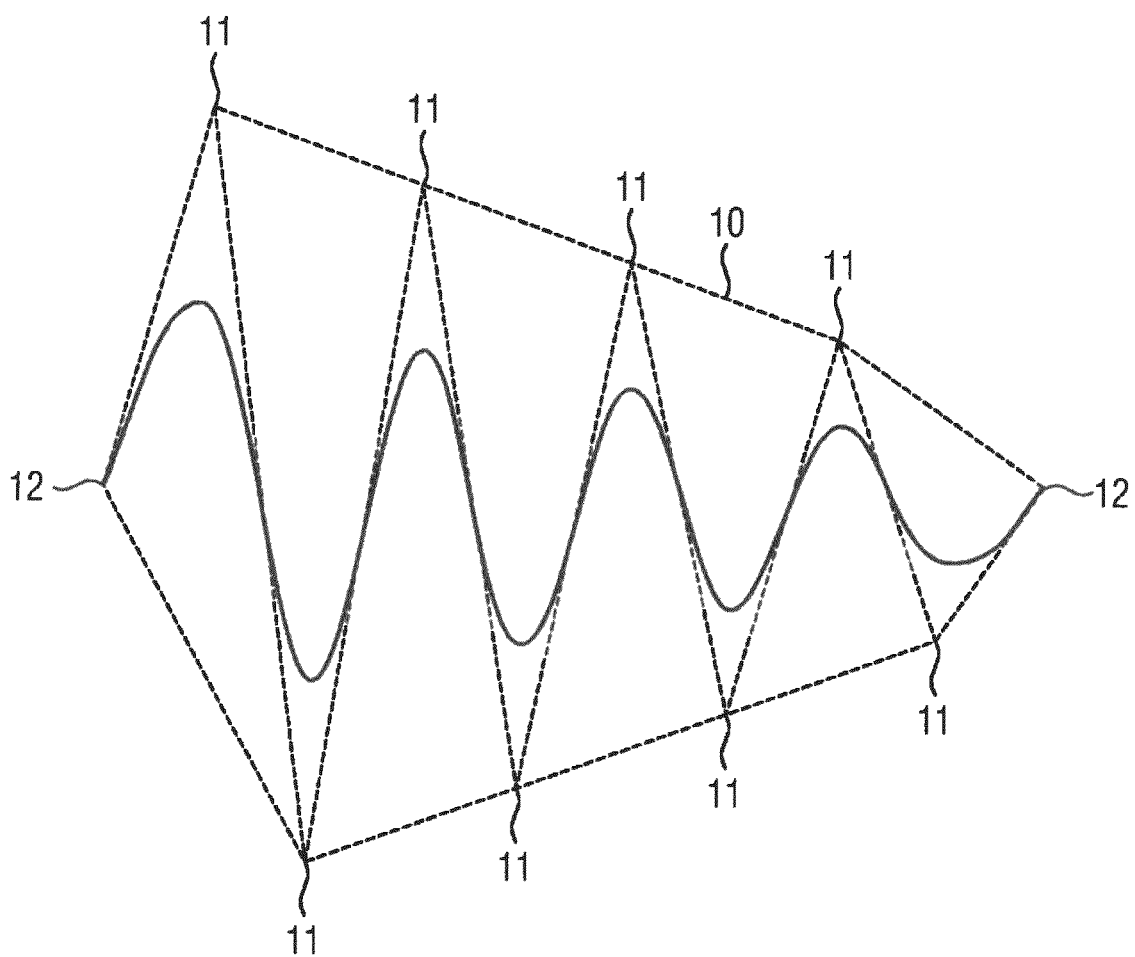
FIG. 6 shows a section of a one-dimensional spline.

In the case of a two-dimensional spline, the parameters with which the respective section is parameterized can, as shown in FIGS. 5 and 6, in particular be checkpoints 11 and a sequence of nodes 12 of the spline. If the spline is fractional and rational, weights must also be defined for the checkpoints 11. Checkpoints 11 and nodes 12 as well as weights are generally known to those skilled in the art as a description of a rational or a fractional rational spline. Purely by way of example, reference may be made to the standard reference book by Carl de Boor: "A Practical Guide to Splines", Springer Verlag Berlin, 2001.

The description of the spline by the nodes 12, checkpoints 11 and if necessary, weights is clear in the sense that the nodes 12, checkpoints 11 and if necessary, weights clearly define the spline. Conversely, however, different specifications for nodes 12, checkpoints 11 and if necessary, weights are possible, all of which result in the same spline. This is also generally known to those skilled in the art. In particular, further nodes 12 and checkpoints 11 and if necessary, weights can be specified beyond a minimum required number of nodes 12 and the associated checkpoints 11 and if necessary, weights without changing the spline as such. This only requires a suitable choice of nodes 12, checkpoints 11 and if necessary, weights.

On the basis of the corresponding specification of the parameters of the sections, the monitoring facility 7 in step S2 can in particular first determine the surface of the element 2 (and—assuming corresponding modelling—also of the other elements 3, 4) of the machine. If necessary, the monitoring facility 7 can also determine the volume occupied by the respective element 2 to 4 of the machine on the basis of the modelling of the surface of the respective element 2 to 4. The determination of the surface is readily possible with given splines. The determination of the volume occupied is also readily possible for a given surface. These two processes therefore need not be explained in detail.

Figure 7:
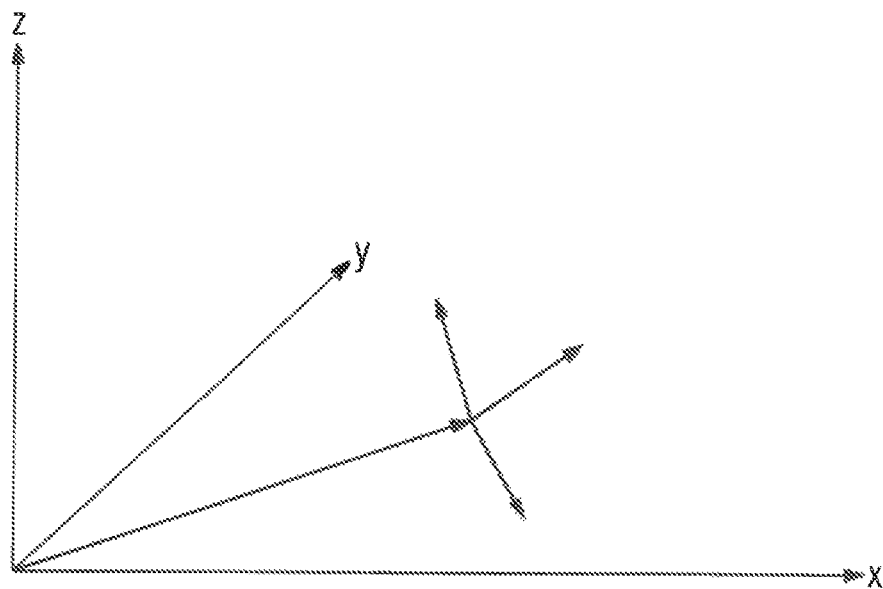
FIG. 7 shows a transformation of position and orientation of the origin of a coordinate system.

The surface of the element 2—as aforementioned, this can also apply analogously to the other elements 3, 4 of the machine—is related to a coordinate system of the element 2 as shown in FIG. 5. On the basis of the position values, the surface determined in step S2 and/or the volume determined in step 32 therefore need only be translationally displaced and rotationally oriented in the working space of the machine in step S5. This takes place, as indicated in FIG. 7 for the element 2, by corresponding transformation of the location of the origin of the coordinate system of the element 2 of the machine in the working space of the machine and corresponding transformation of the orientation of the coordinate system of the element 2 in the working space of the machine. The arrow starting from the origin of the coordinate system of FIG. 7 shows the translational displacement, and the other orientation of the coordinate system arranged at the end of the arrow shows the transformation of the orientation. Analogous procedures are also possible here if necessary for the other elements 3, 4 of the machine.

Figure 8:
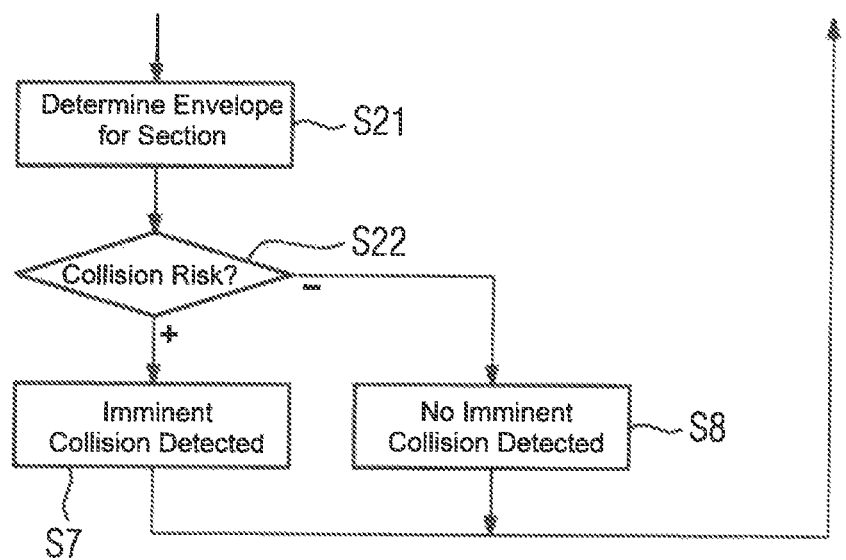
FIG. 8 shows a flow chart.

To check for a collision in step S6, the procedure in FIG. 8 is followed:

First, in a step S21, the monitoring facility 7 determines an envelope 10 for the corresponding section—see FIG. 6 for the one-dimensional spline as an example. The monitoring facility 7 determines the envelope 10 on the basis of the checkpoints 11 of the respective spline. Insofar as they are specified, the weights are irrelevant for determining the envelope 10. The envelope 10 is shown only in FIG. 6 for reasons of better clarity and illustration. In the case of the envelope 10, as shown in FIG. 6, straight connecting lines of the checkpoints 11 are boundary lines of surfaces of the respective envelope 10. The envelope 10 has the property that the actual contour of the corresponding section of the modelled element 2 of the machine lies within the envelope 10. The envelope 10 is easy to determine. Furthermore, it is easy to determine whether or not a certain point of the working space lies within the envelope 10. In particular, these determinations are possible in an easier manner than when the spline itself is used for calculation. The monitoring facility 7 can therefore carry out the collision monitoring itself with the envelope 10 in step S22. The monitoring facility 7 thus uses the envelope 10 as a surface occupied by the respectively modelled element 2 of the machine in the respective section or the volume determined thereon.

The procedure of FIG. 8 may be configured in various ways. Hereinafter, a possible such embodiment will be explained in connection with FIG. 9.

Figure 9:
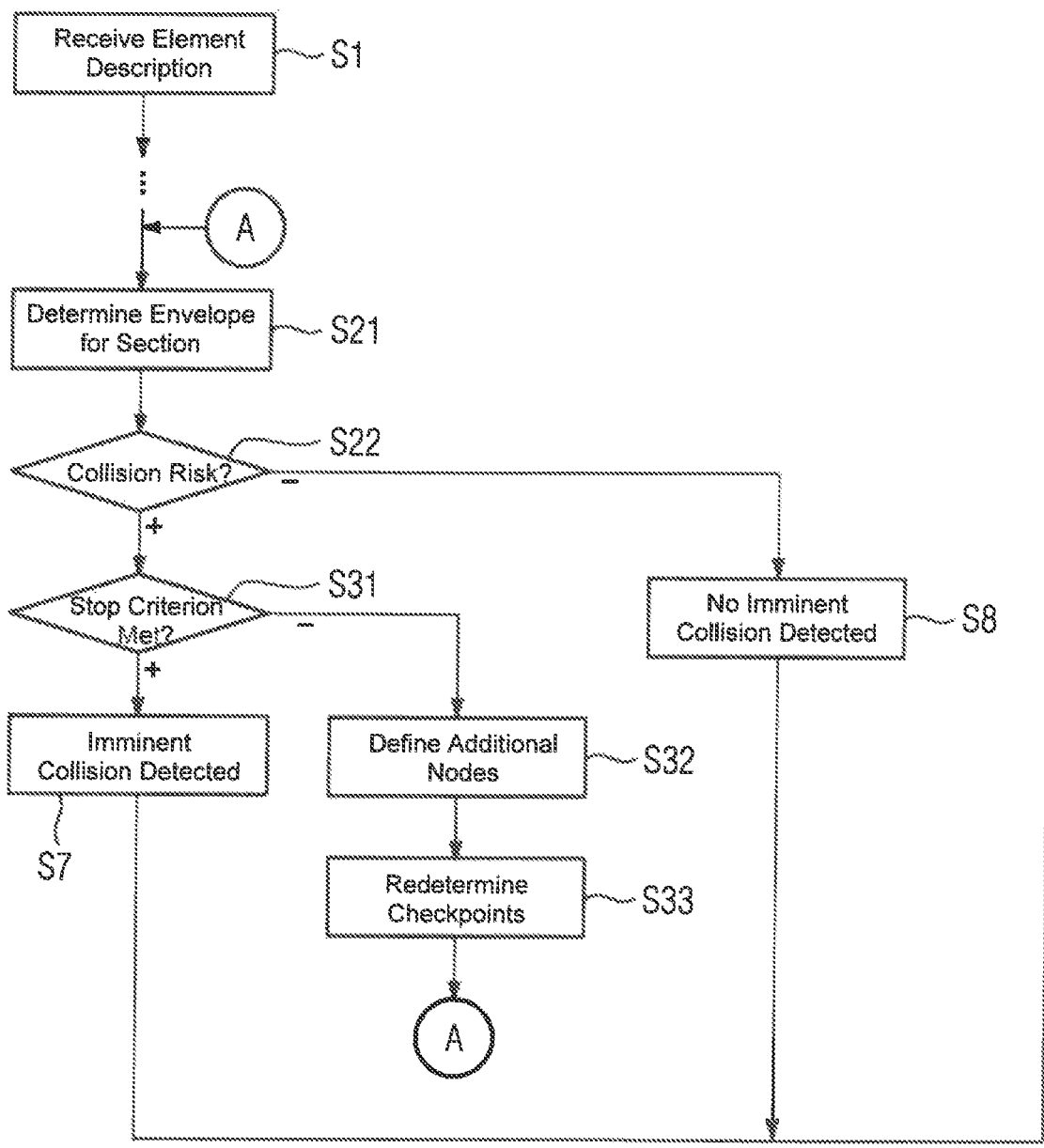
FIG. 9 shows a flow chart.
Figure 10:
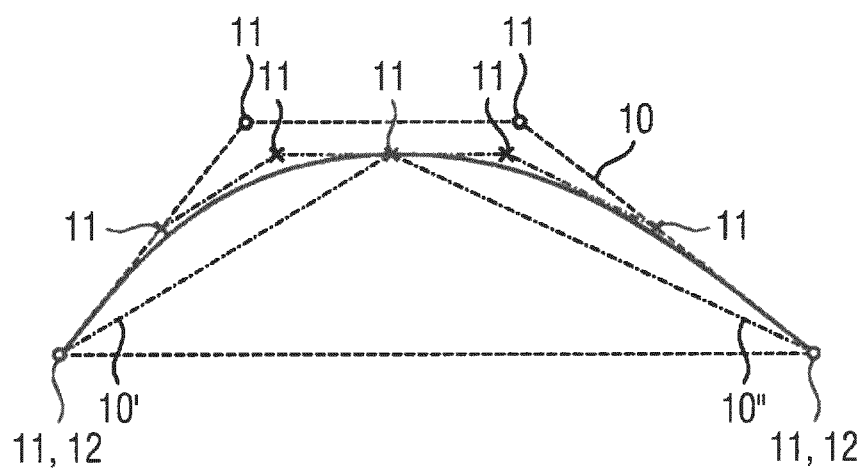
FIG. 10 shows a cutout of a one-dimensional spline, and FIG. 11 likewise shows a cutout of a one-dimensional spline.

According to FIG. 9, initially only basic nodes and the associated checkpoints (as well as, if necessary, the associated weights) are defined as nodes 12 and checkpoints 11 for the respective spline. This definition can be carried out, for example, within the framework of step S1. FIG. 10 shows, by way of example, such basic checkpoints and the envelope 10 defined thereby for a one-dimensional spline. The basic checkpoints are shown as small circles, the envelope 10 as a dashed line which connects the basic checkpoints. The spline is shown in solid lines. The basic checkpoint at the beginning of the spline and the basic checkpoint at the end of the spline He on the spline itself. The other basic checkpoints can in individual cases lie on the spline itself, but generally lie outside the spline as shown in FIG. 10. The corresponding embodiments also apply in a completely analogous manner to a two-dimensional spline.

Step S21 of FIG. 8 as such is retained within the framework of the procedure of FIG. 9. Step S22 as such is also retained. In addition, however, S31 to S33 are present. In step S31, the monitoring facility 7 checks whether a stop criterion is met. If the stop criterion is met, the monitoring facility 7 proceeds to step S7. If the stop criterion is not met, the monitoring facility 7 proceeds to step S32. In step S32, the monitoring facility 7 defines additional nodes 12 (at least one) for the respective spline—in addition to the nodes defined before the execution of step S32.

In step S33, the monitoring facility 7 redetermines the checkpoints 11. Step S33 is determined in such a way that the now defined nodes 12 and checkpoints 11 describe the same spline as before. The spline itself is therefore not changed. The newly determined checkpoints 11 are represented by small crosses in FIG. 10. The monitoring facility 7 preferably determines at least one of the additional nodes 12 in such a way that at least some of the respective newly determined checkpoints 11 lie between the beginning and the end of the spline and on the spline. The monitoring facility 7 then returns to step S21. The additional checkpoints 11 are also indicated by small crosses in FIG. 10.

Due to the specific selection and determination of the additional nodes 12 and checkpoints 11, it is ensured that, in the renewed execution of step 321, the envelope 10 can be divided into a plurality of—at least two—new envelopes 10', 10", wherein the two news envelopes 10', 10" are at a smaller maximum distance from the respective spline than the previous envelope 10. The new envelopes 10', 10" are shown in dash-dotted lines in FIG. 10, insofar as they differ from the envelope 10.

It is possible that the sequence of steps S21, 322, 331, S32 and S33 is carried out repeatedly. In this case, new additional nodes 12 are defined again and again, checkpoints 11 are determined and new envelopes 10', 10" are determined again and again. In any case, however, starting from step S22, the routine of FIG. 9 is exited and a transition is made to step 38 if there is no risk of elements 2 to 4 of the machine colliding with one another. Furthermore, in any case, starting from step 331, the routine of FIG. 9 is exited and a transition is made to step S7 if there is a risk of elements 2 to 4 of the machine colliding with one another. In both these cases, the result last determined in step 322 is therefore adopted as final.

If, on the other hand, an imminent collision is detected, but the stop criterion is not met, then—as aforementioned: repeated several times if necessary—in each case in addition to the currently defined nodes 12 and determined checkpoints 11 for the respective spline, additional nodes 12 are defined and nodes 11 determined and if necessary, weights are defined so that a now determined respective envelope—consisting, for example, of the envelopes 10', 10"—is at a shorter maximum distance from the respective spline than in the previous iteration. New collision testing is then performed with the new envelopes 10', 10".

The stop criterion can be determined, in particular, by the fact that the detected envelopes 10, 10', 10" approach the spline itself sufficiently, that is to say the maximum distance falls below a predetermined threshold value. In particular, it is generally known to those skilled in the art how, in a simple and efficient manner, an upper limit for the distance can be determined on the basis of the currently defined checkpoints 11. This distance can be compared to the predetermined threshold value.

As is also generally known to those skilled in the art, splines have the property that although the respective spline is completely and unambiguously described, on the one hand, by the nodes 12 and the checkpoints 11 and if necessary, the weights, the checkpoints 11 only influence the spline within a certain vicinity of the respective checkpoint 11. This is explained in more detail hereinafter by way of example in connection with FIG. 11 for a one-dimensional spline. The corresponding embodiments apply in a completely analogous manner, but also for a two-dimensional spline.

Figure 11:
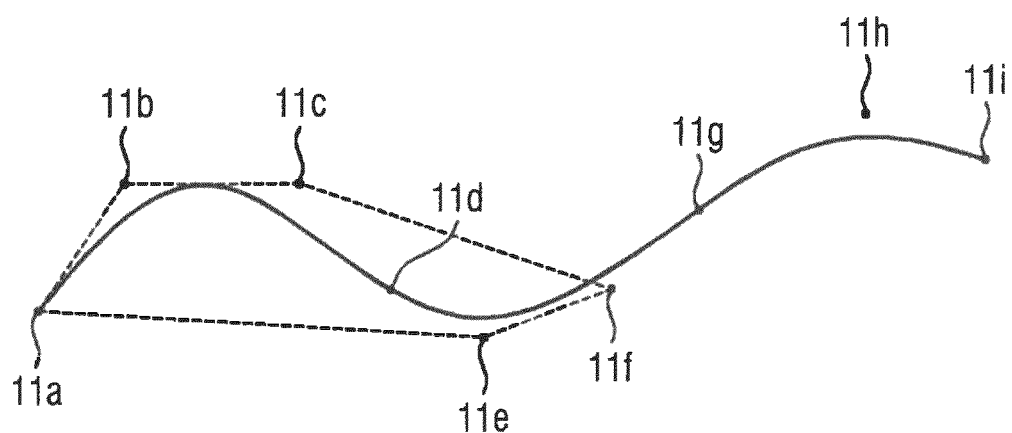

In FIG. 11, the checkpoints 11 are additionally supplemented by a small letter a to i in accordance with their sequence. The course of the spline, for example, in the area between the checkpoints 11c and 11d, is influenced—for example—by the checkpoints 11a to 11f, but no longer by checkpoints 11 further away, in the present case therefore the checkpoints 11g, 11h and 11i. Analogously, the course of the spline is influenced, for example, in the area between the checkpoints 11d and 11e—for example—by the checkpoints 11b to 11g, but no longer by checkpoints 11 further away, in the present case therefore the checkpoints 11a, 11h and 11i. Similar embodiments apply to the other areas of the spline.

It is therefore possible to single out groups of adjacent checkpoints 11 for each section, for example, for the area between the checkpoints 11c and 11d, the checkpoints 11a to 11f, for the area between the checkpoints 11d and 11e, the checkpoints 11b to 11g, etc. For each group of adjacent checkpoints 11 singled out this is shown in FIG. 11 for the checkpoints 11a to 11f—the envelope 10 can therefore be determined. It is therefore possible to use only this envelope 10 for the respective associated area—for example, for the area between the checkpoints 11c and 11d—in order to carry out collision testing.

Testing must, of course, be carried out for each area in which collision testing is to be performed, that is to say, if necessary, both for the area between the checkpoints 11a and 11b and for the area between the checkpoints 11b and 11c etc. A collision is detected as a result if a collision results for one of the areas tested.

In summary, the present invention thus relates to the following facts:

A machine having a plurality of axes 1 by means of which elements 2 to 4 of the machine are moved relative to one another in a position-controlled fashion. A monitoring facility 7 receives a number of groups p*, p of position values of the axes 1. The groups p*, p of position values each specify the position of the elements 2 to 4 of the machine relative to one another. On the basis of modelling of the elements 2 to 4, modelling of the kinematics of the elements 2 to 4 for the groups p*, p of position values of the number of groups p*, p of position values in each case, the monitoring facility 7 determines which surfaces and/or volumes the elements 2 to 4 of the machine respectively occupy in a working space of the machine. Said monitoring facility checks, on the basis of the determined surfaces and/or volumes, whether there is a risk of elements 2 to 4 of the machine colliding with one another and reacts in accordance with the result of the check. The monitoring facility 7 models at least parts of the surfaces of the elements 2 to 4 by means of two-dimensional splines which are themselves defined by nodes 12 and checkpoints 11. Said monitoring facility determines, on the basis of the checkpoints 11 of the splines for the sections, envelopes 10 which enclose the respective element 2 to 4 in the respective section and uses the respective envelope 10 as a surface which is occupied by the respective element 2 to 4 in the respective section. Straight connecting lines of the checkpoints 11 are boundary lines of surfaces of the envelopes 10.

The present invention has many advantages. In particular, compact data storage is possible, which means that less storage space is required. Furthermore, in practice, if a desired modelling accuracy is required, often considerably fewer individual sections need be used than in the prior art. Furthermore, there is no loss of accuracy compared to the real contour of the elements 2 to 4. This is in contrast to the prior art, hi which the modelling always results in an approximation. The number of false alarms or—even worse—incorrectly undetected collisions can be significantly reduced.

Although the invention has been illustrated and described in detail by the preferred exemplary embodiment, the invention is not limited by the disclosed examples and other variations can be derived therefrom by a person skilled in the art without departing from the scope of the invention.

The invention claimed is:

1. A method for monitoring an operation of a machine having a plurality of axes configured to move elements of the machine relative to one another in a position-controlled fashion, the method comprising:
   receiving at a monitoring facility a plurality of groups of position values of the axes, wherein the groups of position values specify a position of the elements relative to one another,
   based on modelling of the elements and modelling of a kinematics of the elements for the groups of the position values, determining with the monitoring facility a surface and/or a volume taken up in a working space of the machine by a respective element,
   modelling with the monitoring facility at least part of the surface of at least one of the elements with two-dimensional splines defined by nodes and checkpoints,
   determining with the monitoring facility, based on the checkpoints of a respective spline for a respective section, a respective envelope which envelops at least one element in the respective section, wherein straight connecting lines connecting the checkpoints of the respective spline are boundary lines of surfaces of the respective envelope, using the respective envelope as the surface that is taken up by the at least one element in the respective section, checking with the monitoring facility based on the determined surfaces and/or volumes whether there is a risk for a collision between the elements, and receiving control commands to control the operation of the plurality of axes of the machine, and move the elements of the machine in the position-controlled fashion.

2. The method of claim 1, wherein the two-dimensional splines are additionally defined by weights.

3. The method of claim 1, wherein the surfaces of the respective element are related to a coordinate system of the respective element, further comprising:

transforming, based on the position values, a location of an origin and an orientation of the coordinate system of the respective element in the working space of the machine.

4. The method of claim 2, further comprising:

initially defining as nodes, checkpoints and weights for the respective spline only basic nodes and associated checkpoints and weights, iteratively performing with the monitoring facility, until either no risk for a collision between the elements has been detected or a stop criterion is met, the following steps:

a) checking with the monitoring facility, based on a respective envelope determined by the currently defined checkpoints, whether there is a risk for a collision;

b) accepting with the monitoring facility as final a result of the checking that there is no risk for a collision;

c) checking with the monitoring facility whether the stop criterion is met when there is a risk for a collision between the elements;

d) accepting with the monitoring facility as final a result of the checking that there is a risk for a collision and that the stop criterion is met;

e) defining with the monitoring facility, when there is a risk for a collision and the stop criterion is not met, additional nodes for the respective spline in addition to the currently defined nodes and determining anew the checkpoints and weights, so that the additional nodes and the anew determined checkpoints and weights describe the respective spline as before, wherein a newly determined respective envelope has a shorter maximum distance from the respective spline than the respective envelope determined before the definition of the additional nodes and the newly determined checkpoints.

5. The method of claim 4, wherein the respective additional nodes are defined in such a way that at least some of the newly determined checkpoints are located on the spline between a beginning and an end of the spline.

6. The method of claim 1, further comprising:

selecting groups of adjacent checkpoints for the sections, determining for the selected groups in each case a respective envelope, and checking the respective envelope whether a collision occurs.

7. A computer program product for a monitoring facility monitoring an operation of a machine having a plurality of axes configured to move elements of the machine relative to one another in a position-controlled fashion, the computer program product embodied in a non-transitory computer-readable medium and comprising machine code which, when loaded into a memory of a processor of the monitoring facility and executed by the processor, causes the monitoring facility to:

receive a plurality of groups of position values of the axes, wherein the groups of position values specify a position of the elements relative to one another, based on modelling of the elements and modelling of a kinematics of the elements for the groups of the position values, determine a surface and/or a volume taken up in a working space of the machine by a respective element, model at least part of the surface of at least one of the elements with two-dimensional splines defined by nodes and checkpoints, determine, based on the checkpoints of a respective spline for a respective section, a respective envelope which envelops at least one element in the respective section, wherein straight connecting lines connecting the checkpoints of the respective spline are boundary lines of surfaces of the respective envelope, use the respective envelope as the surface that is taken up by the at least one element in the respective section, check based on the determined surfaces and/or volumes whether there is a risk for a collision between the elements, and receive control commands to control the operation of the plurality of axes of the machine, and move the elements of the machine in the position-controlled fashion.

8. A monitoring facility monitoring an operation of a machine having a plurality of axes configured to move elements of the machine relative to one another in a position-controlled fashion, wherein the monitoring facility is programmed using a computer program product of claim 7.

9. A machine, comprising a plurality of axes configured to move elements of the machine relative to one another in a position-controlled fashion, a monitoring facility configured to receive a plurality of groups of position values of the axes, wherein the groups of position values specify a position of the elements relative to one another, based on modelling of the elements and modelling of a kinematics of the elements for the groups of the position values, determining a surface and/or a volume taken up in a working space of the machine by a respective element, modelling at least part of the surface of at least one of the elements with two-dimensional splines defined by nodes and checkpoints, determining, based on the checkpoints of a respective spline for a respective section, a respective envelope which envelops at least one element in the respective section, wherein straight connecting lines connecting the checkpoints of the respective spline are boundary lines of surfaces of the respective envelope, using the respective envelope as the surface that is taken up by the at least one element in the respective section, and checking with the monitoring facility based on the determined surfaces and/or volumes whether there is a risk for a collision between the elements, and a control facility connected to the monitoring facility and controlling the operation of the plurality of axes of the machine and moving the elements of the machine in the position-controlled fashion.

* * * * *